(12) United States Patent
Kemper et al.

(10) Patent No.: US 10,540,659 B2
(45) Date of Patent: *Jan. 21, 2020

(54) SYSTEM FOR PERSONAL AUTHORIZATION CONTROL FOR CARD TRANSACTIONS

(71) Applicant: Visa U.S.A. Inc., San Francisco, CA (US)

(72) Inventors: Lynn Kemper, San Carlos, CA (US); Akshey Shawn Vij, San Ramon, CA (US); Robin O'Connell, San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/246,257

(22) Filed: Jan. 11, 2019

(65) Prior Publication Data

US 2019/0220862 A1 Jul. 18, 2019

Related U.S. Application Data

(63) Continuation of application No. 12/129,217, filed on May 29, 2008, now abandoned, which is a (Continued)

(51) Int. Cl.
*G06Q 20/40* (2012.01)
*G06Q 30/06* (2012.01)
(Continued)

(52) U.S. Cl.
CPC ........... *G06Q 20/405* (2013.01); *G06Q 20/04* (2013.01); *G06Q 20/202* (2013.01);
(Continued)

(58) Field of Classification Search
CPC ........ G06K 19/00; G06Q 20/20; G06Q 20/40; G07B 15/00
(Continued)

(56) References Cited

U.S. PATENT DOCUMENTS 5,177,342 A 1/1993 Adams
5,384,449 A 1/1995 Peirce
(Continued)

FOREIGN PATENT DOCUMENTS

EP 0745961 A2 12/1996
EP 0540234 B1 3/1998
(Continued)

OTHER PUBLICATIONS

Hribar, "Secure electronic transaction," Apr. 2000, University of Maribor, vol. 33, No. 4, pp. 281-285.
(Continued)

*Primary Examiner* — Edwyn Labaze
(74) *Attorney, Agent, or Firm* — Kilpatrick Townsend & Stockton LLP

(57) ABSTRACT

An authorization system allows for cardholder-provided parameters to a personal authorization subsystem. The parameters can be selected by the cardholder to limit the authorizations that would otherwise be granted on the card. The parameters can indicate limits by frequency, dollar amount, merchant, geographic location, time of day, combinations thereof, or the like. Authorization for a given transaction, even where authorized by an issuer and a network operator, might be denied based on self-constraints set by the cardholder. In some variations, messages are sent to the cardholder based on constraints set by the cardholder and transactions might be approved and messaged, or denied and messaged.

19 Claims, 8 Drawing Sheets

Related U.S. Application Data continuation of application No. 11/747,659, filed on May 11, 2007, now Pat. No. 7,427,021, which is a continuation of application No. 10/093,002, filed on Mar. 5, 2002, now Pat. No. 7,389,275.

(51) Int. Cl.

| | | |
|---|---|---|
| *G07F 7/08* | (2006.01) | |
| *G06Q 20/38* | (2012.01) | |
| *G06Q 20/04* | (2012.01) | |
| *G06Q 20/20* | (2012.01) | |

(52) U.S. Cl.
CPC ........... *G06Q 20/382* (2013.01); *G06Q 20/40* (2013.01); *G06Q 20/401* (2013.01); *G06Q 20/403* (2013.01); *G06Q 20/4037* (2013.01); *G06Q 30/0601* (2013.01); *G07F 7/08* (2013.01)

(58) Field of Classification Search
USPC ..... 235/380, 379, 375, 382, 487; 705/39, 44
See application file for complete search history.

(56) References Cited

U.S. PATENT DOCUMENTS

| | | |
|---|---|---|
| 5,465,206 A | 11/1995 | Hilt et al. |
| 5,500,513 A | 3/1996 | Langhans et al. |
| 5,526,409 A | 6/1996 | Conrow et al. |
| 5,530,438 A | 6/1996 | Bickham et al. |
| 5,576,965 A | 11/1996 | Akasaka et al. |
| 5,615,110 A | 3/1997 | Wong |
| 5,621,201 A | 4/1997 | Langhans et al. |
| 5,655,007 A | 8/1997 | McAllister |
| 5,708,422 A | 1/1998 | Blonder et al. |
| 5,878,337 A | 3/1999 | Joao et al. |
| 5,903,830 A | 5/1999 | Joao et al. |
| 5,914,472 A | 6/1999 | Foladare et al. |
| 5,953,710 A | 9/1999 | Fleming |
| 5,991,410 A | 11/1999 | Albert et al. |
| 6,000,832 A | 12/1999 | Franklin et al. |
| 6,052,675 A | 4/2000 | Checchio |
| 6,055,505 A | 4/2000 | Elston |
| 6,064,990 A | 5/2000 | Goldsmith |
| 6,067,529 A | 5/2000 | Ray et al. |
| 6,094,643 A | 7/2000 | Anderson et al. |
| 6,182,894 B1 | 2/2001 | Hackett et al. |
| 6,226,624 B1 | 5/2001 | Watson et al. |
| 6,282,522 B1 | 8/2001 | Davis et al. |
| 6,330,550 B1 | 12/2001 | Brisebois et al. |
| 6,339,766 B1 | 1/2002 | Gephart |
| 6,381,584 B1 | 4/2002 | Ogram |
| 6,456,984 B1 | 9/2002 | Demoff et al. |
| 6,529,725 B1 | 3/2003 | Joao et al. |
| 6,535,855 B1 | 3/2003 | Cahill |
| 6,560,581 B1 | 5/2003 | Fox et al. |
| 6,651,885 B1 | 11/2003 | Arias |
| 7,096,003 B2 | 8/2006 | Joao et al. |
| 7,107,250 B2 | 9/2006 | Harrison |
| 7,137,551 B1 | 11/2006 | Crews et al. |
| 7,343,149 B2 | 3/2008 | Benco |
| 7,357,310 B2 | 4/2008 | Calabrese |
| 7,401,049 B2 | 7/2008 | Hobbs |
| 7,610,216 B1 | 10/2009 | May et al. |
| 7,653,597 B1 | 1/2010 | Stevanovski et al. |
| 7,840,466 B2 | 11/2010 | Frazier et al. |
| 7,885,899 B1 | 2/2011 | Sancho |
| 7,954,706 B2 | 6/2011 | Calabrese et al. |
| 8,024,271 B2 | 9/2011 | Grant |
| 8,095,475 B2 | 1/2012 | Hutson et al. |
| 8,229,854 B2 | 7/2012 | Stephen et al. |
| 8,793,189 B2 | 7/2014 | Kemper et al. |
| 9,685,024 B2 | 6/2017 | Kemper et al. |
| 2001/0032182 A1 | 10/2001 | Kumar et al. |
| 2001/0056409 A1 | 12/2001 | Bellovin et al. |
| 2002/0013711 A1 | 1/2002 | Ahuja et al. |
| 2002/0026396 A1 | 2/2002 | Dent et al. |
| 2002/0026418 A1 | 2/2002 | Koppel et al. |
| 2002/0035548 A1 | 3/2002 | Hogan et al. |
| 2002/0046186 A1 | 4/2002 | Nishio et al. |
| 2002/0058494 A1 | 5/2002 | Timonen et al. |
| 2002/0099642 A1 | 7/2002 | Schwankl et al. |
| 2002/0120587 A1 | 8/2002 | D'Agostino |
| 2002/0138445 A1 | 9/2002 | Laage et al. |
| 2002/0152179 A1 | 10/2002 | Racov |
| 2002/0161724 A1 | 10/2002 | Peters |
| 2002/0174030 A1 | 11/2002 | Praisner et al. |
| 2002/0194124 A1 | 12/2002 | Hobbs et al. |
| 2002/0198806 A1 | 12/2002 | Blagg et al. |
| 2003/0028481 A1 | 2/2003 | Flitcroft et al. |
| 2003/0101137 A1 | 5/2003 | Wronski, Jr. |
| 2003/0172040 A1 | 9/2003 | Kemper et al. |
| 2003/0216996 A1 | 11/2003 | Cummings et al. |
| 2004/0039694 A1 | 2/2004 | Dunn et al. |
| 2004/0128243 A1 | 7/2004 | Kavanagh et al. |
| 2004/0185830 A1 | 9/2004 | Joao |
| 2004/0199470 A1 | 10/2004 | Ferry, Jr. et al. |
| 2005/0170814 A1 | 8/2005 | Joao |
| 2005/0184145 A1 | 8/2005 | Law et al. |
| 2007/0174448 A1 | 7/2007 | Ahuja et al. |
| 2007/0250920 A1* | 10/2007 | Lindsay .................. G06F 21/31 726/7 |
| 2008/0126233 A1 | 5/2008 | Hogan et al. |
| 2008/0167961 A1 | 7/2008 | Wentker |
| 2008/0172317 A1 | 7/2008 | Deibert |
| 2008/0183480 A1 | 7/2008 | Carlson |
| 2008/0228648 A1 | 9/2008 | Kemper |
| 2008/0265018 A1 | 10/2008 | Kemper |
| 2009/0150288 A1 | 6/2009 | Bishop et al. |
| 2009/0204524 A1 | 8/2009 | McGeorge |
| 2010/0138388 A1 | 6/2010 | Hammad |
| 2010/0274691 A1 | 10/2010 | Hammad |
| 2011/0010296 A1 | 1/2011 | Kemper |
| 2012/0259783 A1 | 10/2012 | Kemper et al. |
| 2013/0166332 A1* | 6/2013 | Hammad .............. G06Q 40/10 705/5 |
| 2015/0095239 A1* | 4/2015 | Specogna .......... G06Q 20/3224 705/72 |
| 2017/0249636 A1 | 8/2017 | Kemper et al. |
| 2018/0108007 A1* | 4/2018 | Sawant ............. G06Q 20/3674 |

FOREIGN PATENT DOCUMENTS

| | | |
|---|---|---|
| EP | 1953688 A1 | 8/2008 |
| JP | 2008171169 A | 7/2008 |
| WO | 200046769 A1 | 8/2000 |
| WO | 200141093 A1 | 6/2001 |
| WO | 200301866 A1 | 1/2003 |
| WO | 03/083737 A1 | 10/2003 |

OTHER PUBLICATIONS

Office Action dated Aug. 30, 2013 in U.S. Appl. No. 12/878,877, 33 pages.
Office Action dated Oct. 10, 2013 in U.S. Appl. No. 13/527,449, 8 pages.
Office Action dated Aug. 19, 2013 in U.S. Appl. No. 12/130,143, 9 pages.
Office Action dated Feb. 27, 2014 in U.S. Appl. No. 12/128,513, 42 pages.
Notice of Allowance dated Mar. 24, 2014 in U.S. Appl. No. 13/527,449, 8 pages.
U.S. Appl. No. 61/443,213, entitled Mobile Fraud Alerts, 63 pages.
U.S Appl. No. 60/294,107, filed May 29, 2001, entitled "System and Method for a Prepaid Card Issued by a Foreign Financial Institution" (57 pages).
U.S. Appl. No. 60/458,096, filed Mar. 27, 2003, entitled "System and Method for Supplemental Card Limits" (15 pages).
Non-Final Office Action dated Jun. 14, 2019 for U.S. Appl. No. 15/583,733, 17 pages.

(56) References Cited

OTHER PUBLICATIONS

U.S. Appl. No. 15/583,733 , "Final Office Action", dated Oct. 23, 2019, 20 pages.

* cited by examiner

SYSTEM FOR PERSONAL AUTHORIZATION CONTROL FOR CARD TRANSACTIONS

CROSS-REFERENCES TO RELATED APPLICATIONS

This application is a continuation of U.S. patent application Ser. No. 12/129,217, filed on May 29, 2008, which is a continuation of U.S. patent application Ser. No. 11/747,659, filed on May 11, 2007, which is a continuation of U.S. patent application Ser. No. 10/093,002, filed on Mar. 5, 2002, all of which are hereby incorporated by reference, for all purposes.

FIELD OF THE INVENTION

The present invention relates to financial transaction processing systems in general and more specifically to financial transaction processing systems that relate a transaction to a cardholder and include authorization systems that authorize or deny credits or debits related to transactions.

BACKGROUND OF THE INVENTION

Credit card transactions are a common method of effecting payment in connection with a transaction. In a typical transaction, a cardholder selects merchandise or services and presents a card, such as a VISA® credit card, check card or debit card, to a merchant. Before the merchant releases the merchandise or performs the service, the merchant will typically get authorization for a charge in the amount agreed on for the merchandise or service, at the point-of-sale.

Today, most authorizations are electronic, where the merchant obtains the cardholder name, account number and possibly other information. The merchant transmits that information, along with transaction-specific information, possibly including a merchant identifier, a transaction amount and a transaction description. The merchant transmits the information as part of an authorization message directed through an authorization network to a card issuer. When a card issuer approves a transaction, the merchant is given certain assurances that the merchant's bank account will be credited with the amount of the transaction and accordingly is willing to release the goods or services to the purchaser.

The cardholder generally agrees to pay for any transactions applied to the cardholder's account. In some cases, however, the cardholder's issuer financial institution (FI) or the network operator will be liable to the merchant instead of the cardholder, as in the case of a stolen card being used after the cardholder notified the issuer FI. Naturally, the issuer FI and network operator have a large incentive to limit the number of transactions for which they are liable. As a result, the typical merchant agreement requires that the merchant perform an authorization before the risk of non-payment passes from the merchant to the issuer FI or the network operator and the issuer FI and network operator place constraints on authorizations.

For example, where a card is typically used for small transactions relating to groceries and gasoline, frequent transactions relating to expensive jewelry might prompt the authorization system to deny the transaction as a suspect activity even if ultimately the cardholder is legitimately purchasing jewelry. The denial serves to protect the issuer FI and limit the liability of the issuer FI for transactions that the cardholder might later indicate as being fraudulent. The authorization system would not necessarily deny transactions that were not intended by the cardholder, and is generally limited to denying transactions under conditions that the issuer FI or the network operator might deem indicative of fraud. The issuer FI might also deny authorization where the transaction amount would cause the cardholder's credit limit to be exceeded.

In many cases, the openness and independence of the card network makes it more difficult to control the uses of the cards, but that becomes even more important where the cards used in the card network are so widely accepted and pervasive.

BRIEF SUMMARY OF THE INVENTION

In one embodiment of an authorization system according to the present invention, a cardholder provides parameters to a personal authorization subsystem. The parameters can be selected by the cardholder to limit the authorizations that would otherwise be granted on the card. The parameters can indicate limits by frequency, dollar amount, merchant, merchant type, credit limits, geographic location, time of day, combinations thereof, or the like. In a preferred embodiment, the cardholder provides the parameters to the cardholder's issuer financial institution, which integrates the cardholder authorizations with the issuer financial institution authorization process. The issuer financial institution is independent of the merchants accepting the card and the card network operator operates an open, independent network for accepting the cards of many issuer financial institutions usable with many independent merchants.

For a further understanding of the nature and advantages of the invention, reference should be made to the ensuing description in conjunction with the accompanying drawings

DETAILED DESCRIPTION OF THE INVENTION

Figure 1:
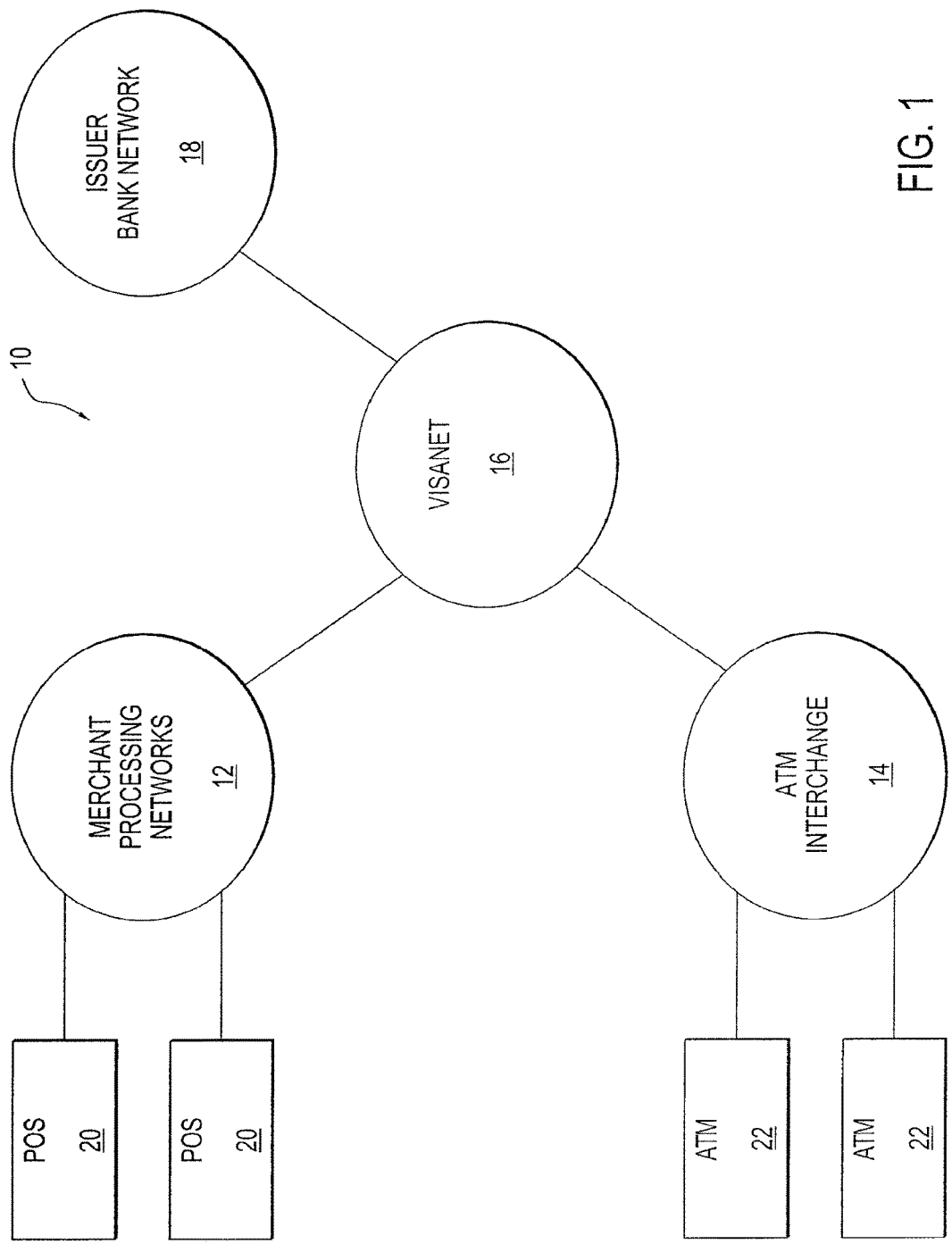
FIG. 1 is a block diagram of a transaction system wherein the present invention might be used.

FIG. 1 is a block diagram of a transaction system 10. As shown there, transaction system 10 includes a merchant processing networks 12, an automated teller machine (ATM) interchange 14 coupled to a transaction network 16, such as the VISANET® network, which is in turn coupled to an issuer bank network 18. As shown, a plurality of point of sale (POS) terminals 20 are coupled to merchant processing network 12 and a plurality of ATM's 22 are coupled to ATM interchange 14. It should be understood that the typical transaction system couples many merchant networks, ATM interchanges and issuer bank networks, in addition to merchant bank networks.

In a typical operation of transaction system 10, a card is presented to a POS terminal 20 and a transaction is generated between a cardholder and a merchant that 1) debits a cardholder's account at the cardholder's issuer bank, 2) credits a merchant's account at the merchant acquirer bank and generates the necessary electronic messages for settlement among the banks and other transaction processing. As part of the transaction, an authorization will be performed, wherein the merchant gathers up the transaction information and sends an authorization request message to the network and receives back an authorization result, such as "approved", "denied", "ask for ID", etc.

Figure 2:
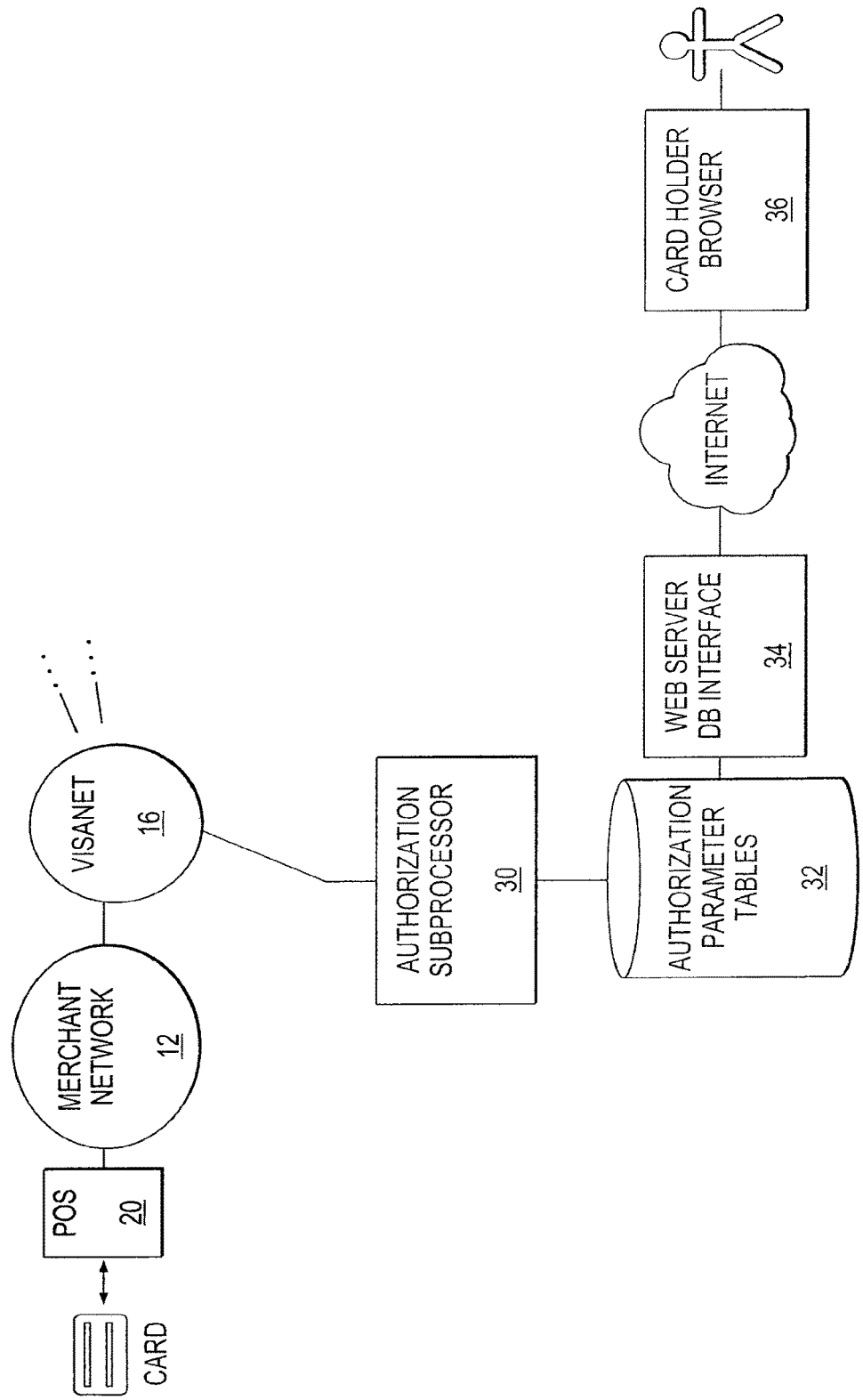
FIG. 2 is a more detailed block diagram illustrating aspects of an authorization subprocessor and a cardholder's interaction with the subprocessor.

FIG. 2 is a more detailed block diagram illustrating aspects of authorization. In one such process, a card is presented to POS terminal 20 which includes means for reading card contents, such as a magnetic card reader or a smartcard reader. POS terminal 20 is coupled to merchant network 12 and transaction network 16, which performs authorizations to protect the issuer FI or the network operator.

Transaction network 16 is also coupled to an authorization subprocessor 30, which can cause an otherwise allowable transaction to be denied, based on cardholder-provided authorization parameters available in an authorization parameter table (APT) of a plurality of authorization parameter tables 32. A cardholder's APT can be populated and updated or modified by a web server database interface 34 under the direction of a web browser 36 operated by the cardholder. As used herein, the cardholder refers to the person or persons that that issuer FI holds responsible for payment. A legitimate card presenter, i.e., the person presenting the card in a transaction, might be the cardholder, but could also be other authorized agents, such as a person to whom an additional card was issued. While this description describes a Web client-server based interface, it should be understood that other interfaces, such as direct connections, local network connections, kiosks, telephone interfaces or the like would be used instead to allow a cardholder to modify the APT associated with that cardholder's account.

Figure 3:
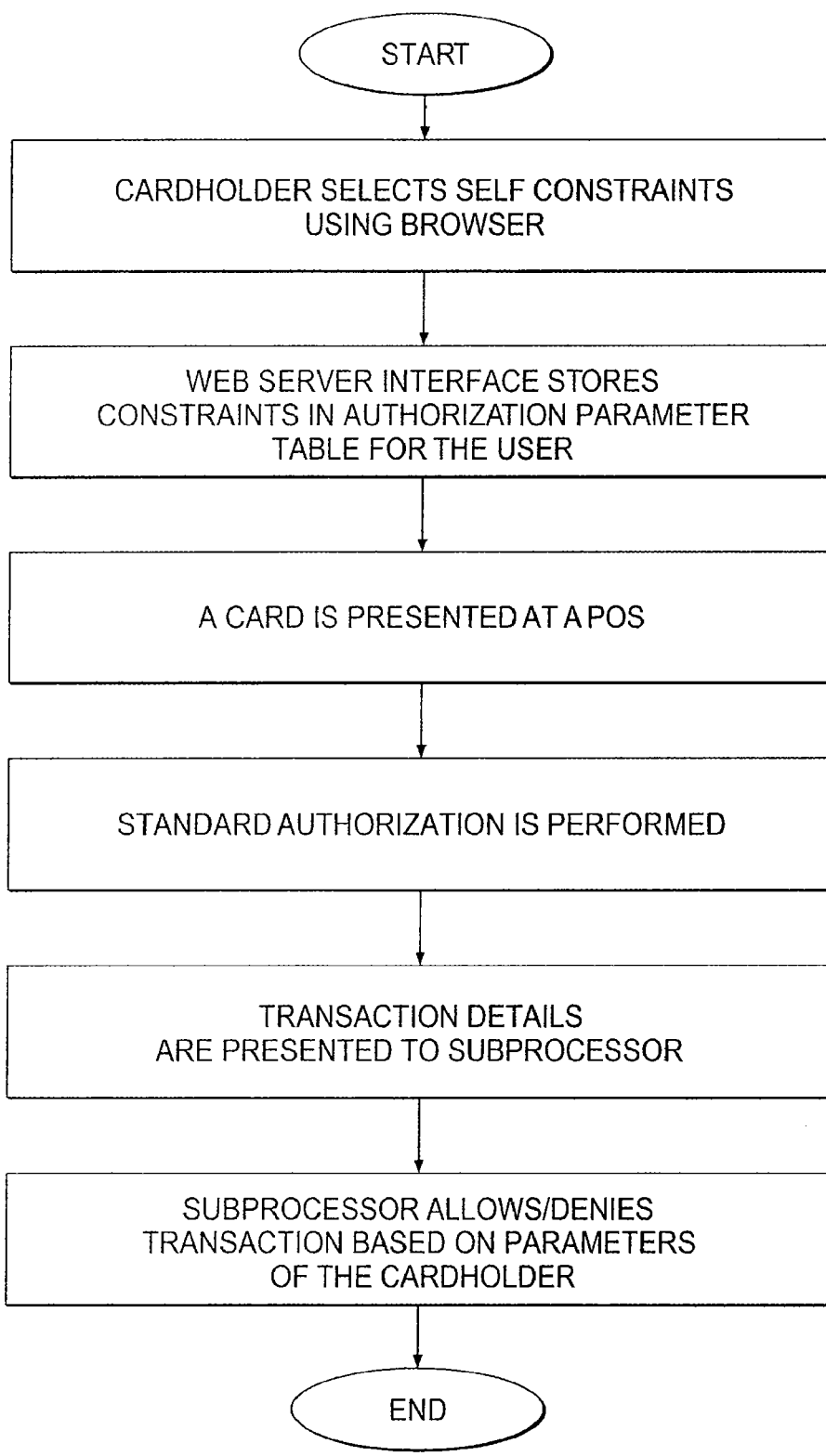
FIG. 3 is a flowchart illustrating a process of authorization control.
Figure 4A:
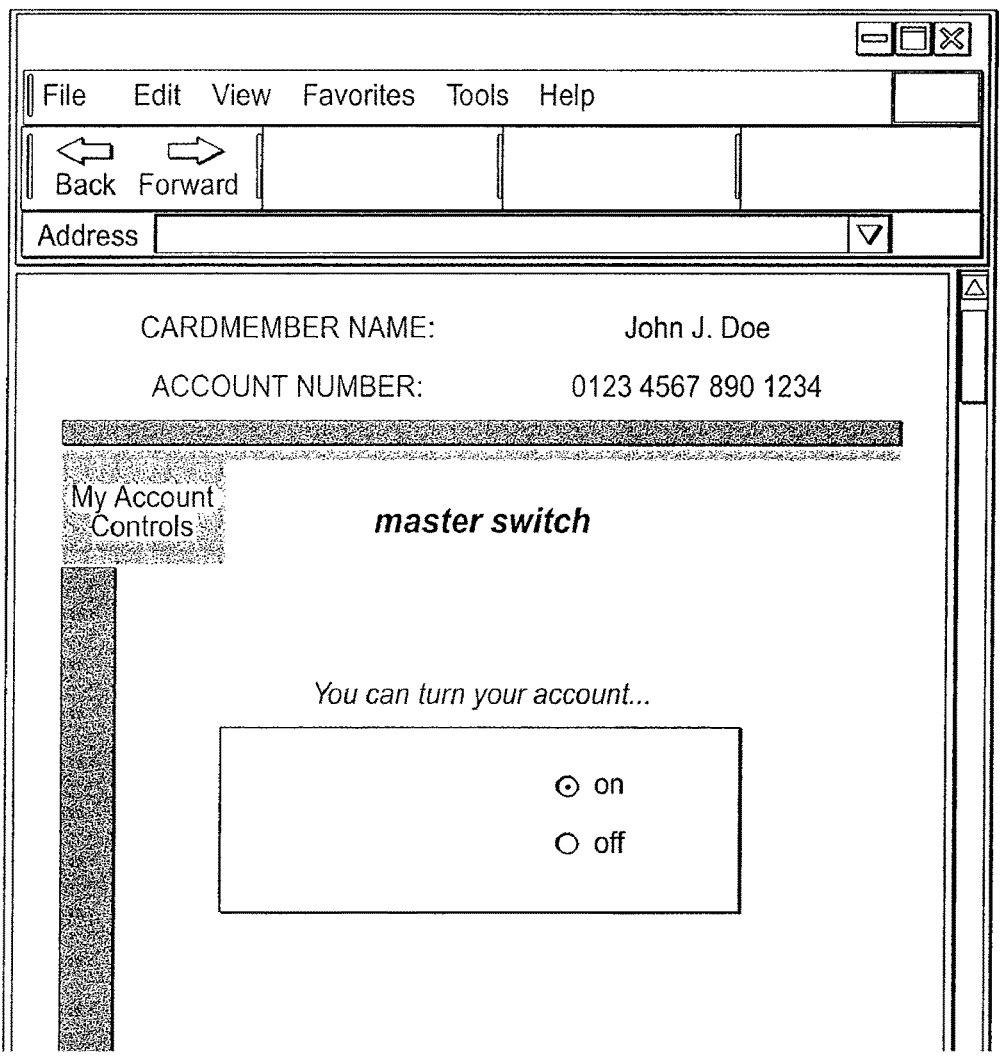
FIGS. 4(a)-(e) illustrate aspects of a user interface usable to set cardholder authorization parameters.
Figure 4B:
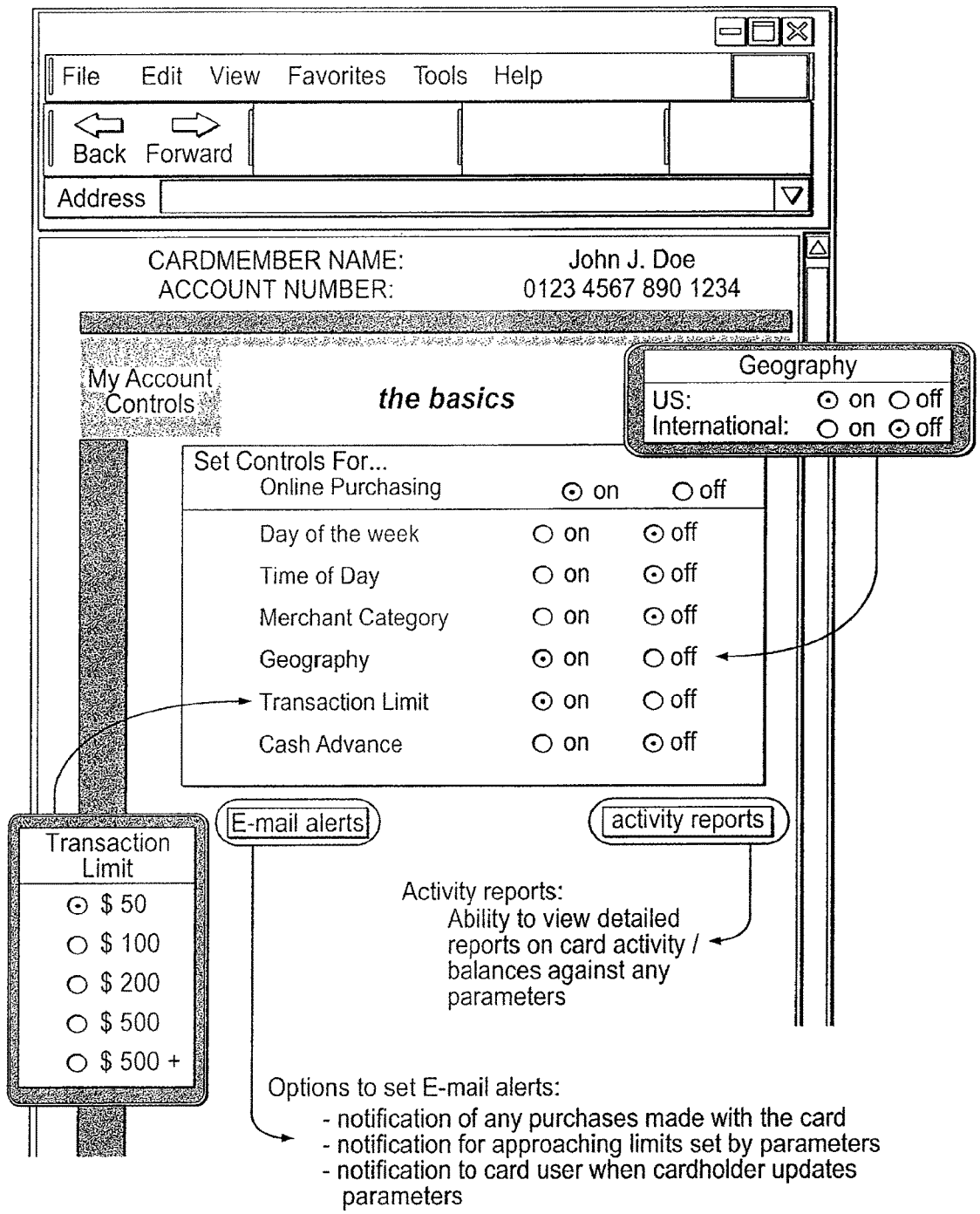
Figure 4C:
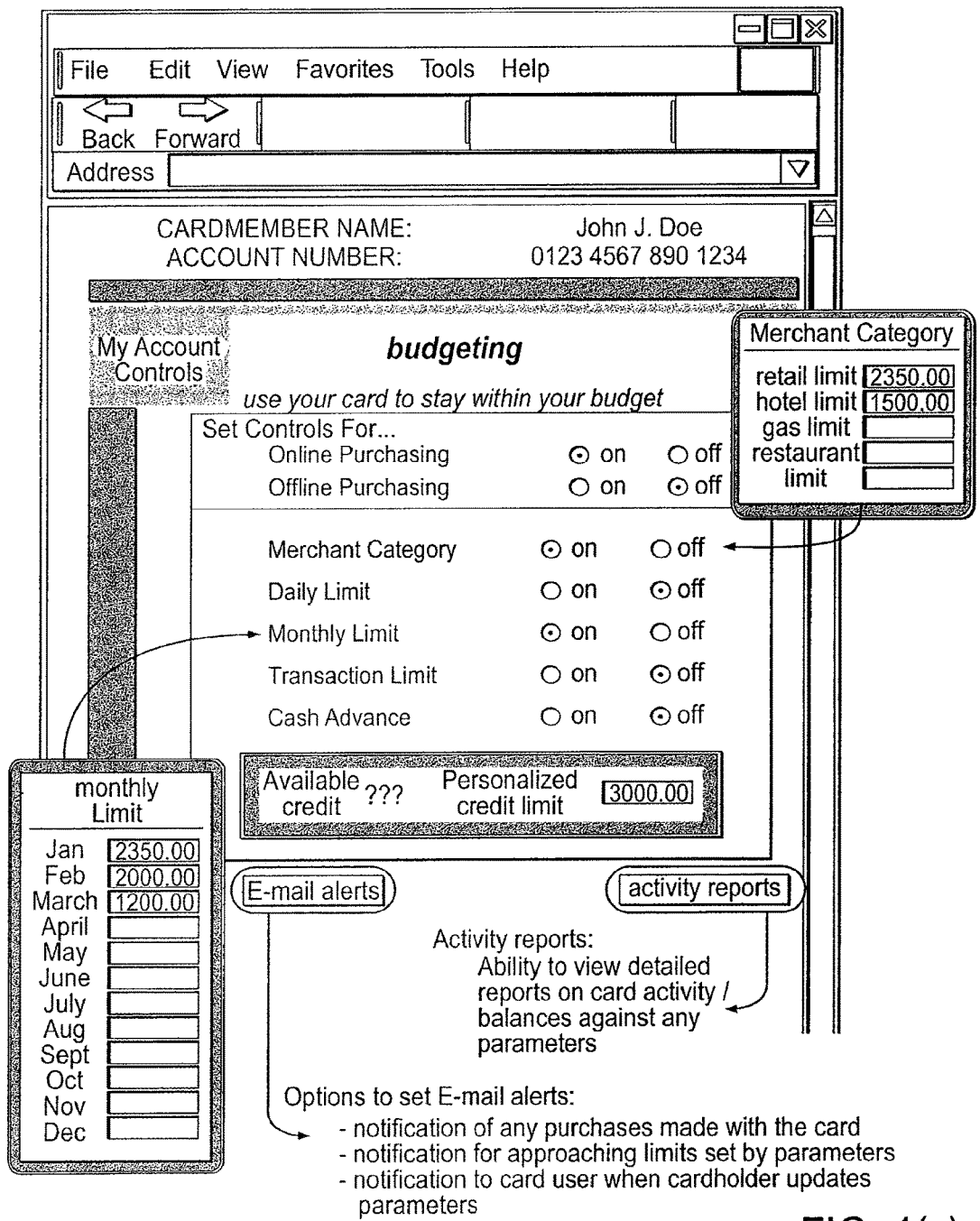
Figure 4D:
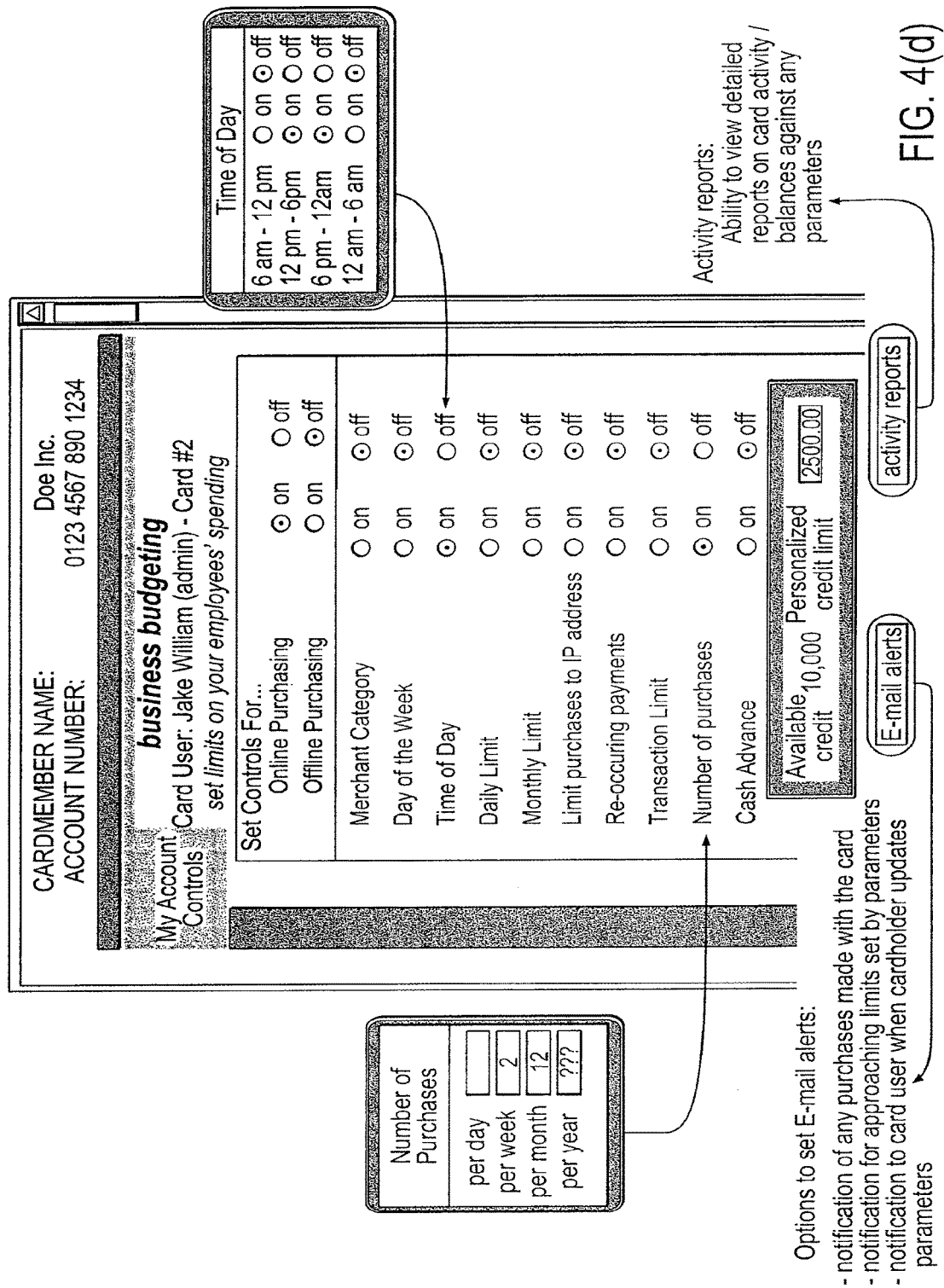
Figure 4E:
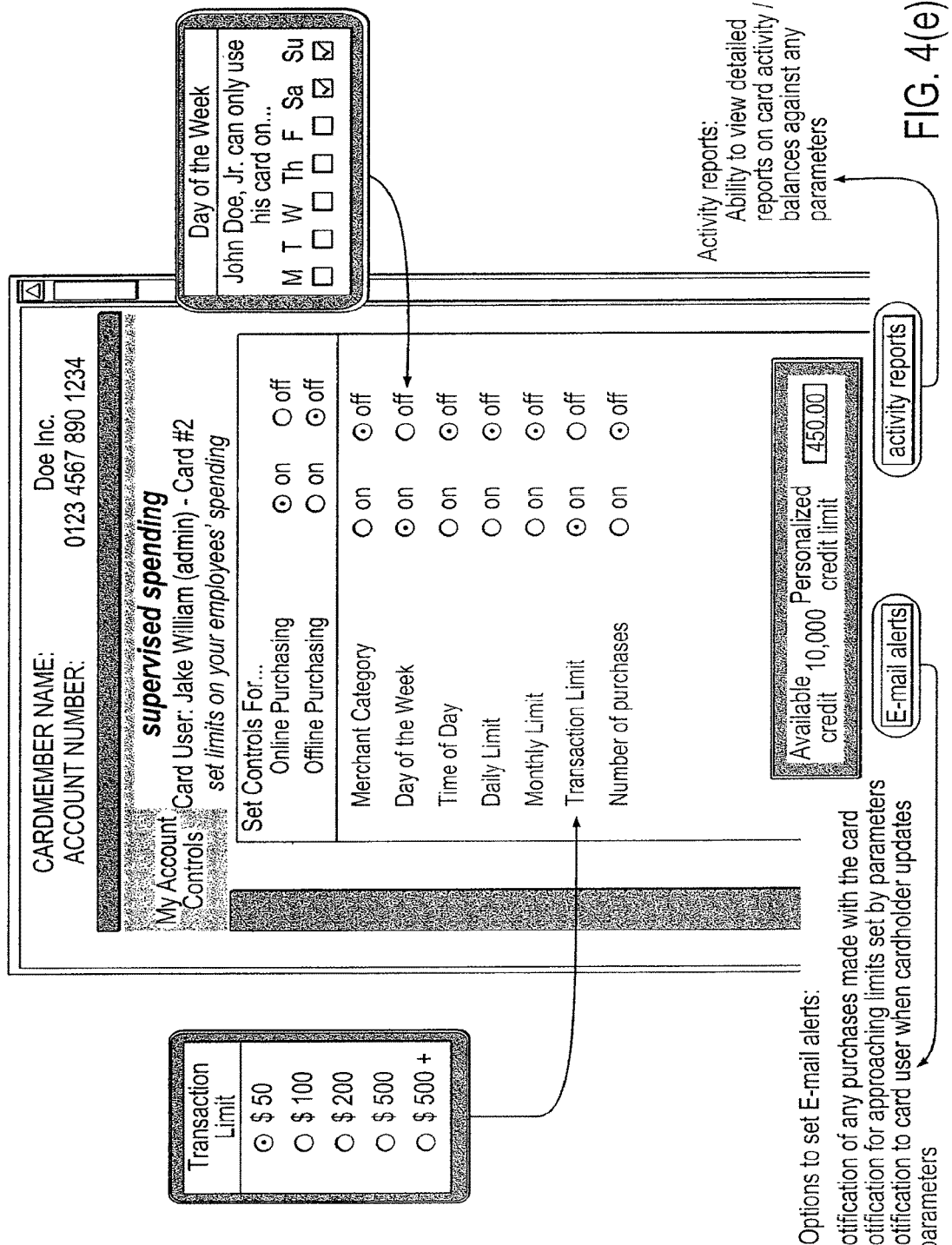

In a typical operation, illustrated in FIG. 3, the cardholder (i.e., one of those ultimately responsible for nonfraudulent transactions on the card) will create, modify or update the corresponding APT to set self constraints using a browser and the linked-to web server interface stores such self constraints in the corresponding APT. Once the APT contains the cardholder supplied self constraint parameters, if a card is presented at a POS terminal, a normal authorization process occurs, wherein the issuer FI or network owner criteria for allowing the transaction are tested. If the issuer FI and network owner would deny the transaction, no further processing is needed and a denial message can be sent to the POS terminal. However, if the issuer FI and network owner would approve the transaction, the transaction details are then presented to the authorization subprocessor. The authorization subprocessor approves or denies the transaction based on the cardholder's APT, which contains constraints set by the cardholder.

While the self constraints are set by the cardholder and therefore could easily be overridden by the cardholder himself or herself, they nonetheless constrain the cardholder's account, at least by denying transactions where the cardholder unintentionally exceeds constraints, another card carrier exceeds the constraints and also constrain fraudulent use of the card that is only detectable in advanced based on constraints set by the cardholder.

The authorization subprocessor is described above as acting to approve or deny a transaction. In some embodiments, the authorization subprocessor might, in addition to or in lieu of approval/denial, perform cardholder notifications. A cardholder notification is a message to the cardholder, or to a system designated by the cardholder, that a transaction occurred and fell within cardholder-set parameters. In some cases, the transaction is also denied, but typically the transaction is allowed, with notification. Such details can be specified by the cardholder in the parameters. The notification messages can be by mail, by telephone, by pager, by e-mail, by instant message, or by other messaging methods currently known or otherwise.

Examples of Constraints

Detailed examples of some of the possible constraints will now be described. Such constraints are specified in the APT. For ease of management, the constraints might be grouped for the cardholder into a few categories of constraints, as follows:

Transaction Type
  Deny cash advances, but allow purchases.
Transaction Amount
  Allow a transaction below a set limit
  Allow transaction if total transactions would remain below a limit (personalized credit limit)
  Allow transaction if total transactions in a set time period are below a limit
Daily Limits
Limit on number of transactions
Transaction Details
  Allow transaction only during set times of the day (this allows the cardholder to in effect, indicate that any transaction made between midnight and 5 AM is a priori a fraudulent transaction)
  Allow transaction only during set times of the week (e.g., movie purchases not allowed during the week)
  Allow offline transactions, but not online (telephone, Internet, etc.) transactions
  Allow online transactions, but only from prespecified IP addresses
  Allow transactions based on geographic location (e.g., block purchases outside U.S.)
  Allow transactions based on the merchant category type (e.g., restaurants and hotels but not retail stores)
Other Limits
  Preauthorization for one-time transactions
  Recurring Payment Authorization
  Varying controls from card carrier to card carrier
  Instant Cut-off (useful when the cardholder is aware of the theft but the issuer FI has not yet detected it or is still processing the cardholder's request for closing their account.)

Arbitrary combinations of these constraints might also be possible, such as a cardholder specifying that cash advances are allowed within the U.S., but not outside the U.S. and outside the U.S. transactions are allowed, but only for merchants in the food, medical, travel and lodging categories during a prespecified date range. As another example, a parent cardholder might get an e-mail whenever a child card carrier effects an online purchase.

In addition to constraints, the APT might also contain data that directs other actions unrelated to authorization. One such action is ancillary messaging, wherein under cardholder selected conditions, a message (such as a pager message, e-mail message or instant message) is sent to a prespecified address if the conditions are met. Such conditions include card carriers that are minors effecting a transaction with an inappropriate merchant. In some cases, the cardholder might set the condition such that an e-mail is generated with every transaction, thus allowing for the electronic collection of receipts. The messages might be selective, such that only approvals result in messages or only denials result in messages (and might include the reason for the denial).

User Interfaces

Examples of the user interfaces that might be presented to a cardholder via a cardholder browser are shown in FIGS. 4(a)-(e). Other user interfaces might also be used, such as a calendar view where the cardholder could click on calendar days to allow or deny transactions for those dates. Another user interface might provide a listing of various merchant types to allow that cardholder to set predetermined ranges for each of a plurality of merchant types.

Variations

In the above, described system, the cardholder creates, modifies or updates the cardholder's APT via a Web interface. In another variation, the cardholder can interact with a telephone voice response unit (VRU) or automatic response unit (ARU) using the telephone keypad, to interact with a server that performs the requested actions on the APT. In a useful combination, the Web interface is accessible from a Web page maintained by the issuer FI for card customers. Such a Web interface might be provided to show transaction details and other account information. In some embodiments, the e-mail messages sent to the cardholder could include a hypertext link to a page showing details of the transaction so the cardholder can jump directly to a detail page from an e-mail.

Where multiple card carriers (i.e., persons with cards to present for purchases who are not necessarily the cardholder responsible for the account) are present, the user interface might allow for any variations of constraints to be selected and be different for different car carriers.

In a permissive variation, the authorization subprocessor never denies an authorization that would have otherwise been granted by the issuer FI or network operator, but just sends a message to the prespecified location when the transaction hits certain constraints. This might be useful where a cardholder needs or wants to observe transactions as they happen, to allow for early intervention. This might be useful for businesses where the card carriers are employees empowered to make purchases for the business.

Cardholder specified constraints, implemented in an authorization system has now been described. As explained, the cardholder can apply constraints to the use of a card, typically to constrain the purchases of other authorized card carriers and of unauthorized users operating with transaction patterns not likely to be used by the cardholder and thus not constraining on the cardholder (e.g., limited to selected countries, times of day, size of transactions that the cardholder would not participate in), but could also be used by the cardholder to constrain the cardholder himself or herself for particular transactions. The latter might be useful for budget controls or controls on inadvertent spending.

As will be understood by those familiar with the art, the present invention may be embodied in other specific forms without departing from the spirit or essential characteristics thereof. For example, the authorization subprocessor can be integrated in with the authorization processor that applies the issuer FI or network operator criteria to the transaction. As another example, while the present invention is described primarily with reference to credit cards, it is also usable for debit card transactions. As yet another example, while the present invention is described primarily with to merchant POS terminals, it should be understood that other systems for initiating purchase transactions might be used instead, without departing from the scope of the invention, such as the use of a merchant payment server, a PC-based cardholder terminal, a telephone, etc. or other location or system a cardholder might interface to in making a purchase, possibly even including systems where the cardholder does not interface to a system at all.

Accordingly, the disclosure of the preferred embodiments of the invention is intended to be illustrative, but not limiting, of the scope of the invention which is set forth in the following claims.

What is claimed is:

1. A method comprising:
   receiving at an interface to a server computer, a cardholder selection of a combination of notification parameters from a cardholder, the notification parameters specifying constraints that will cause notifications to be sent to the cardholder when transaction details of transactions conducted by a card presenter match the constraints, wherein the constraints specified by the notification parameters are unrelated to authorization of the transactions;
   storing the cardholder selected notification parameters in a parameter table database;
   receiving, by a subprocessor, transaction details of a transaction conducted by a card presenter at a POS terminal or an ATM terminal; determining, with the subprocessor, that the transaction details of the transaction conducted by the card presenter at the POS terminal or the ATM terminal match the constraints, the constraints being unrelated to authorization of the transaction; and
   sending a notification by the subprocessor to a device associated with the cardholder when the transaction details of the transaction conducted by the card presenter match the constraints specified by the notification parameters, the notification including the transaction details of the transaction,
   wherein the constraints are in a plurality of constraints, and wherein the plurality of constraints are displayed to the cardholder such that the cardholder is capable of selecting arbitrary combinations of the constraints.

2. The method of claim 1 wherein the interface is in the form of a web page hosted by an issuer of the cardholder's card.

3. The method of claim 1 wherein the notification parameters include a list of inappropriate merchants and the transaction is being conducted with a merchant in the list of inappropriate merchants.

4. The method of claim 1 wherein the notification parameters include a dollar limit specified per merchant type and the transaction will cause the dollar limit per merchant type to be exceeded.

5. The method of claim 1 wherein the notification is an e-mail comprising a hypertext link to a page showing details of the transaction.

6. The method of claim 1 wherein the cardholder is the card presenter.

7. The method of claim 1 wherein the subprocessor is integrated with a card network that accepts cards from at least two different issuer financial institutions.

8. The method of claim 1 wherein the card presenter is an agent of the cardholder.

9. The method of claim 1, wherein the notification parameters include sending the notification when the transaction is an online transaction from a prespecified IP address.

10. The method of claim 1, wherein the notification parameters include sending the notification when the transaction is initiated from a specified geographic location.

11. The method of claim 1, wherein the notification is an e-mail.

12. The method of claim 1, wherein the interface is maintained by an issuer financial institution.

13. The method of claim 1, wherein the transactions are credit card transactions.

14. The method of claim 1, wherein the subprocessor never denies authorization for a transaction that would have otherwise been granted by an issuer financial institution.

15. The method of claim 1, wherein the interface includes a calendar view.

16. The method of claim 15 the interface allows the cardholder to select different variations of constraints for different card carriers.

17. The method of claim 1 wherein the plurality of constraints are displayed to the cardholder on a browser.

18. The method of claim 17 wherein the browser allows the cardholder to turn on or off controls for a day of the week, time of day, merchant category, and a cash advance.

19. A system comprising:
- an interface to a server computer, configured to receive a cardholder selection of a combination of notification parameters from a cardholder, the notification parameters specifying constraints that will cause notifications to be sent to the cardholder when transaction details of transactions conducted by a card presenter match the constraints, wherein the constraints specified by the notification parameters are unrelated to authorization of the transactions;
- a parameter table database, wherein the parameter table database is configured to store the cardholder selected notification parameters; and
- a subprocessor, configured to receive transaction details of a transaction conducted by a card presenter at a POS terminal or an ATM terminal, and determine that the transaction details of the transaction conducted by the card presenter at the POS terminal or the ATM terminal match the constraints, the constraints being unrelated to authorization of the transaction, and send a notification to a device associated with the cardholder when the transaction details of the transaction conducted by the card presenter match the constraints specified by the notification parameters, the notification including the transaction details of the transaction,
wherein the constraints are in a plurality of constraints, and wherein the plurality of constraints are displayed to the cardholder such that the cardholder is capable of selecting arbitrary combinations of the constraints.

* * * * *